(12) United States Patent
Sakakibara

(10) Patent No.: US 7,363,130 B2
(45) Date of Patent: Apr. 22, 2008

(54) PARKING ASSIST SYSTEMS, METHODS, AND PROGRAMS

(75) Inventor: Seiji Sakakibara, Nagoya (JP)

(73) Assignee: Aisin AW Co., Ltd., Anjo (JP)

( * ) Notice: Subject to any disclaimer, the term of this patent is extended or adjusted under 35 U.S.C. 154(b) by 179 days.

(21) Appl. No.: 11/408,003

(22) Filed: Apr. 21, 2006

(65) Prior Publication Data

US 2006/0255969 A1    Nov. 16, 2006

(30) Foreign Application Priority Data

Apr. 21, 2005    (JP) .............................. 2005-124028

(51) Int. Cl.
  *G06F 19/00*    (2006.01)
(52) U.S. Cl. .................... 701/36; 701/41; 340/932.2
(58) Field of Classification Search ............... 701/1, 701/36, 41; 340/932.2, 937
  See application file for complete search history.

(56) References Cited

U.S. PATENT DOCUMENTS

| | | | |
|---|---|---|---|
| 6,411,867 B1 * | 6/2002 | Sakiyama et al. ............... | 701/1 |
| 6,567,726 B2 * | 5/2003 | Sakiyama et al. ............... | 701/1 |
| 7,053,794 B2 * | 5/2006 | Tanaka et al. ............ | 340/932.2 |
| 7,075,456 B2 * | 7/2006 | Tanaka et al. ............ | 340/932.2 |
| 7,295,227 B1 * | 11/2007 | Asahi et al. ................. | 348/118 |
| 2005/0060073 A1 * | 3/2005 | Tanaka et al. ................. | 701/36 |
| 2005/0264432 A1 * | 12/2005 | Tanaka et al. ............ | 340/932.2 |
| 2006/0271278 A1 * | 11/2006 | Sakakibara et al. ......... | 701/207 |
| 2007/0146165 A1 * | 6/2007 | Tanaka ..................... | 340/932.2 |
| 2007/0273554 A1 * | 11/2007 | Sakakibara .............. | 340/932.2 |

FOREIGN PATENT DOCUMENTS

JP    A 2000-280823    10/2000

* cited by examiner

*Primary Examiner*—Gary Chin
(74) *Attorney, Agent, or Firm*—Oliff & Berridge, PLC

(57) ABSTRACT

Parking assist systems, methods, and programs may take a peripheral image of a vehicle; and may display the peripheral image on a display. The systems, methods, and programs may recognize a parking area and may display a first predicted locus line on the display, the first predicted locus line extending up to a predetermined distance from the vehicle and being superimposed on the peripheral image. The systems, methods, and programs may change the display of the first predicted locus line in accordance with a steering angle of a steering wheel. The systems, methods, and programs may display a second predicted locus line superimposed on the peripheral image, the second predicted locus line extending up to the recognized parking area and being displayed on an extension line of the first predicted locus line and may change the display of the second predicted locus line in accordance with the steering angle of the steering wheel.

20 Claims, 8 Drawing Sheets

PARKING ASSIST SYSTEMS, METHODS, AND PROGRAMS

INCORPORATION BY REFERENCE

The disclosure of Japanese Patent Application No. 2005-124028, filed on Apr. 21, 2005, including the specification, drawings and abstract is incorporated herein by reference in its entirety.

BACKGROUND

1. Related Technical Fields

Related technical fields include parking assist systems, methods, and programs.

2. Related Art

A conventional parking assist system is disclosed in Japanese Patent Application Publication No. JP-A-2000-280823. According to this conventional system, a camera attached to a rear end of the vehicle takes an image of peripheral view, and the imaging data is displayed in a vehicle compartment. In order to easily park the vehicle in a predetermined place while driving backward, the conventional system superimposes on the rear image taken by the rear camera a predicted locus line that changes in accordance with a steering angle of a steering wheel.

SUMMARY

However, the length of the predicted locus line of the above conventional system is as short as 2.7 meters from the rear end of the vehicle. Accordingly, when a driver parks the vehicle into a parking space of a parking lot while driving backward, an end of the predicted locus line displayed in the rear image does not reach the parking space if the distance between the parking space and the point at which the driver begins to reverse is long. As a result, the driver has to perform steering operation to reach the parking space of the parking lot without the use of the locus line. It is thus difficult to park the car smoothly and accurately in such a situation.

It is thus beneficial to provide a parking assist systems, methods, and programs capable of guiding a vehicle by giving appropriate guidance of during parking even if the distance between a parking position and the point at which the driver begins to reverse is long.

Exemplary embodiments of the broad principles descried herein provide parking assist systems, methods, and programs that may take a peripheral image of a vehicle; and may display the peripheral image on a display. The systems, methods, and programs may recognize a parking area and may display a first predicted locus line on the display, the first predicted locus line extending up to a predetermined distance from the vehicle and being superimposed on the peripheral image. The systems, methods, and programs may change the display of the first predicted locus line in accordance with a steering angle of a steering wheel. The systems, methods, and programs may display a second predicted locus line superimposed on the peripheral image, the second predicted locus line extending up to the recognized parking area and being displayed on an extension line of the first predicted locus line and may change the display of the second predicted locus line in accordance with the steering angle of the steering wheel.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
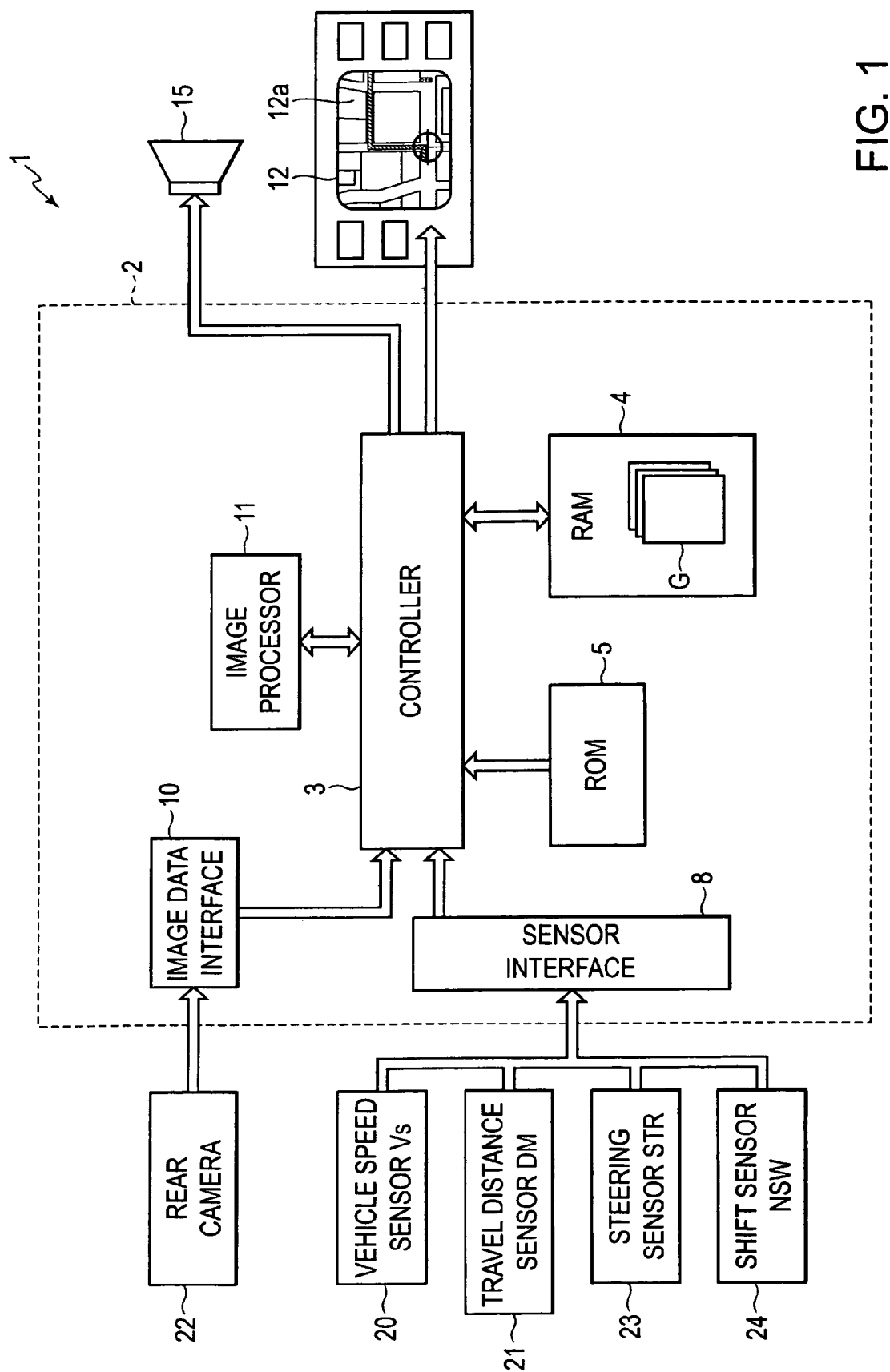
FIG. 1 shows an exemplary parking assist device.

FIG. 1 shows a block diagram illustrating an exemplary structure of a parking assist system or device 1 installed in a vehicle C such as, for example, an automobile.

As shown in FIG. 1, the parking assist device 1 may physically, functionally, and/or conceptually include a control portion 2. The control portion 2 may include, for example, a controller 3 that may execute main control, a RAM 4, and/or a ROM 5. The controller 3 may, for example, control various processes according to various programs. Such programs may include, for example, calculation programs for first predicted locus lines and second predicted locus lines, a combined data output program, and/or a parking guidance program that may be stored in the ROM 5. The controller 3 may physically, functionally, and/or conceptually include, for example, a first predicted locus line calculating unit, a second predicted locus line calculating unit, a crossing point calculating unit, a combining unit, a parking area recognition unit, and/or a display inhibiting unit.

The control portion 2 may also include a sensor interface 8. The controller 3 may receive, for example, a vehicle speed signal (pulse signal) and/or a travel distance signal (pulse signal) of the vehicle C from a vehicle speed sensor 20 and/or a travel distance sensor 21 provided in the vehicle C, via the sensor interface 8. The controller 3 may, for example, calculate a vehicle speed Vs at each time point based on the vehicle speed signal, and may calculate a moving distance DM at each time point based on the travel distance signal. Then, the controller 3 may store the vehicle speed Vs and the moving distance DM calculated at each time point in the RAM 4. Thus, a storage area for storing such data may be included in the RAM 4.

The control portion 2 may further include, for example, an image data interface 10. The image data interface 10 may acquire imaging data from, for example, a rear camera 22 serving as an imaging unit provided on the vehicle C.

Figure 2:
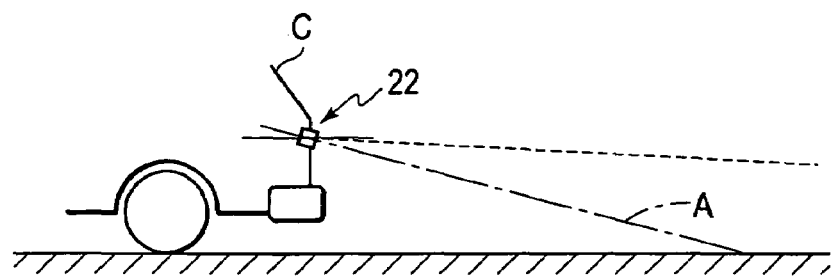
FIG. 2 shows an exemplary an attachment position of a rear camera provided on a vehicle.
Figure 3:
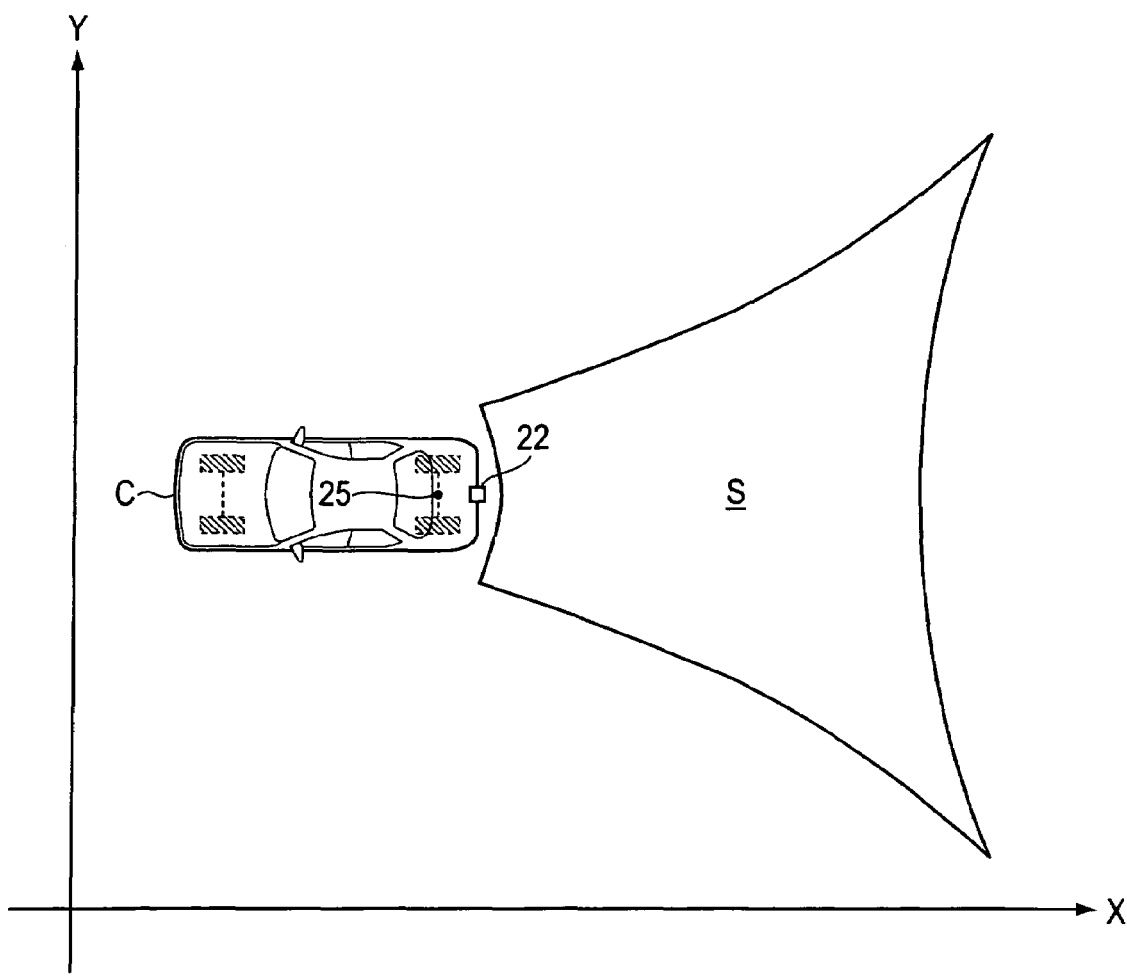
FIG. 3 shows an exemplary imaging range of the rear camera.

As shown in FIG. 2, the rear camera 22 may be attached to a substantially center portion of a rear end of the vehicle C, such as, for example, a back door of the vehicle C. The rear camera 22 may have an optical axis A directed downward. The rear camera 22 may be provided with an optical mechanism including, for example, a wide-angle lens and/or a mirror, and a CCD imaging element (which are not shown). As shown in FIG. 3, the rear camera 22 may have a rear field of view, for example, having a horizontal span of about 140°. The rear camera 22 may take an image within an imaging range S (i.e., a peripheral image) that may include the rear end of the vehicle C and may extend, for example, about 8 m rearward thereof.

Furthermore, the controller 3 may be capable of calculating the imaging range S of the rear camera 22 as coordinates within an X-Y Cartesian coordinate system for the vehicle C (hereinafter referred to as a road coordinate system). This road coordinate system may be defined by X and Y coordinates on a horizontal plane in parallel with the road surface.

Figure 4:
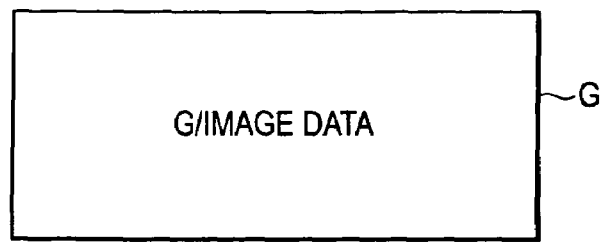
FIG. 4 shows an exemplary data structure of image data.

The imaging data produced by the rear camera 22 may be, for example, digital data obtained by an analogue-to-digital conversion. The image data interface 10 may transmit to the controller 3 the imaging data as, for example, peripheral image data G that can undergo image processing including various corrections and/or combining. When the controller 3 receives the peripheral image data G, the controller 3 may temporarily store the peripheral image data G in the RAM 4, for example, as shown in FIG. 4. Since the rear camera 22 may use a wide-angle lens, when the peripheral image data G is displayed on a display 12 serving as a display unit provided in the parking assist device 1, a so-called distortion aberration may occur, that is, an image around the screen shrinks.

Further, the control portion 2 may be connected to, for example, a steering sensor 23 and a shift sensor 24 provided in the vehicle C, via the sensor interface 8. The steering sensor 23 may detect a steering angle of a steering wheel (steering angle qn) at each time point. The steering sensor 23 may detect the steering angle qn based on a steering angle signal STR. The shift sensor 24 may detect a shift position SHP of a shift lever of a transmission at each time point. The shift sensor 24 may detect a reverse state of the shift lever based on a shift position signal NSW. That is, the controller 3 may receive the steering angle signal STR from the steering sensor 23 and the shift position signal NSW from the shift sensor 24, and may temporarily store the steering angle qn and the shift position SHP detected at each time point in a predetermined storage area in the RAM 4.

Then, the controller 3 may determine whether the shift position SHP of the transmission is in the reverse state based on the shift position signal NSW. When the shift position SHP is in the reverse state and the peripheral image rearward of the vehicle C is simply displayed, the controller 3 may read the peripheral image data G of a current point that has been temporarily stored in the RAM 4, and then may display on the display 12 a rear vision screen 40 serving as a peripheral image screen (e.g., shown in FIG. 5), according to the parking guidance program stored in the ROM 5.

Figure 5:
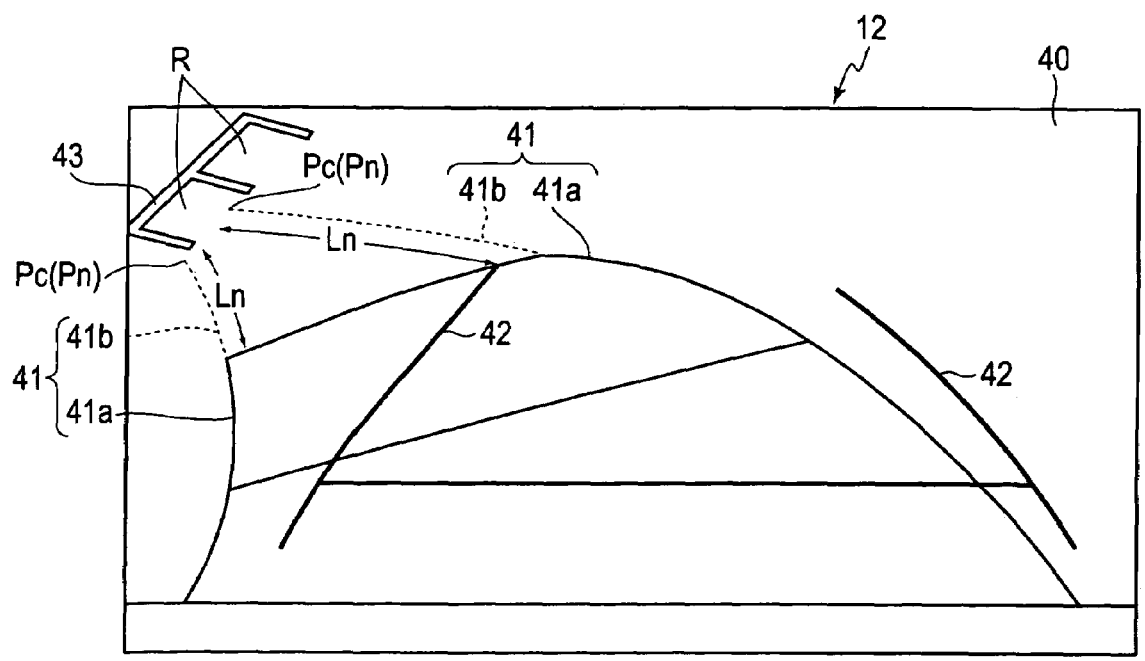
FIG. 5 shows an exemplary screen displayed on a display.

At this time, as shown in FIG. 5, the controller 3 may display, on the display 12, the rear image such that the rear vision screen 40 is superimposed by first predicted locus lines 41$a$ shown by the solid lines and second predicted locus lines 41$b$ shown by the broken lines. Based on the steering angle signal STR, the controller 3 may calculate the first predicted locus lines 41$a$ and the second predicted locus lines 41$b$, and may temporarily store the calculated data in the RAM 4. Then, for example, according to the parking guidance program stored in the ROM 5, the controller 3 may read the data on the first predicted locus lines 41$a$ and the second predicted locus lines 41$b$ temporarily stored in the RAM 4, and displays the data on the display 12.

The first predicted locus lines 41$a$ may be predicted locus lines that indicate tracks along with which the vehicle C travels if the vehicle C is caused to travel for a predetermined distance (for example, about 2.7 m) from the vehicle, based on the steering angle signal STR (or the steering angle qn) at that point of time. The first predicted locus lines 41$a$ may be running loci that change in accordance with the steering angle signal STR and the width of the vehicle C.

The second predicted locus lines 41$b$, extended from the ends of the first predicted locus lines 41$a$, may be predicted locus lines that indicate tracks along with which the vehicle C travels if the vehicle C is caused to travel based on the steering angle signal STR (or the steering angle qn) at that point of time. The second predicted locus lines 41$b$ are also running loci that change in accordance with the steering angle signal STR and the width of the vehicle C.

When calculating the first and second predicted locus lines 41$a$ and 41$b$, the controller 3 may calculate them as single predicted locus lines 41 that combine the first and second predicted locus lines 41$a$ and 41$b$. This is because, for example, the second predicted locus lines 41$b$ may be extended continuously from the ends of the first predicted locus lines 41$a$. The controller 3 may calculate the predicted locus lines 41 using a known method, such as, for example, that disclosed in Japanese Patent Application Publication No. JP-A-2000-280823, incorporated herein by reference in its entirety. Incidentally, the center of turning when traveling rearward at a low speed lies on an extension of an axle 25 provided in the rear of the vehicle C (see FIG. 3). The predicted locus lines 41 may be obtained by calculating a turning radius (=L/tan qn: where L denotes a wheel base) from the steering angle and the wheelbase based on a geometric relationship.

The controller 3 may use portions of the predicted locus lines 41 up to a predetermined distance (for example, about 2.7 m) from the rear end of the vehicle C, as the first predicted locus lines 41$a$. The controller 3 may display, on the display 12, the first predicted locus lines 41$a$ shown as solid lines that are superimposed on the rear vision screen 40. The controller 3 may use other portions of the predicted locus lines 41 that are further extended from the first predicted locus lines 41$a$, as the second predicted locus lines 41$b$. The controller 3 may display, on the display 12, the second predicted locus lines 41$b$ shown as broken lines that are superimposed on the rear vision screen 40.

When displaying the first predicted locus lines 41$a$ and the second predicted locus lines 41$b$ superimposed on the rear vision screen 40, the controller 3 may, for example, display the first and second predicted locus lines 41$a$ and 41$b$ after transforming their coordinates. That is, since the first and second predicted locus lines 41$a$ and 41$b$ may be calculated in the road coordinate system, they can be transformed into image coordinates in order to superimpose them on the rear vision screen 40 of the image coordinates that are taken by the rear camera 22 and displayed. This coordinate transformation can be easily performed based on, for example, a focal distance of a lens of the rear camera 22, an attachment angle of the rear camera 22, and/or the height of the attachment position of the rear camera 22 from the ground. For example, this coordinate transformation may be calculated by a known method disclosed in Japanese Patent Application Publication No. JP-A-2000-280823, incorporated herein by reference in its entirety.

The controller 3 may be configured to calculate the lengths Ln of the second predicted locus lines 41$b$ displayed on the display 12 such that the lengths Ln are variable. In addition, the controller 3 may have a function of image recognition processing, and may perform image recognition to confirm whether a parking area R is displayed on the rear vision screen 40 of the display 12. For example, when the controller 3 recognizes the presence of the parking area R on the rear vision screen 40, the controller 3 may calculate the lengths Ln of the second predicted locus lines 41*b* extending to the parking area R. Specifically, the lengths of the second predicted locus lines 41*b* may be determined by calculating coordinate positions of crossing points Pc (or ends Pn), which may be defined as intersections at which the parking area R and the second predicted locus lines 41*b* (or the predicted locus lines 41) intersect.

As a result, the controller 3 may display, on the display 12, the second predicted locus lines 41*b* to a point at which their ends Pn intersect the parking area R. Therefore, the lengths Ln of the second predicted locus lines 41*b* may become shorter as the vehicle C approaches the parking area R.

The controller 3 may also draw vehicle width extension lines 42 on the rear vision screen 40. The vehicle width extension lines 42 may be representations of the width of the vehicle C, extended rearward. In other words, the vehicle width extension lines 42 are lines when the steering angle is zero.

The display 12 may be a touch panel that may output, at predetermined timing, the peripheral image data G transmitted from the controller 3, image combining data obtained by superimposing, on the peripheral image data G, the first predicted locus lines 41*a*, the second predicted locus lines 41*b* and the vehicle width extension lines 42. Further, when the shift position SHP of the transmission is not in the reverse state, the display 12 may display a screen 12*a* (see FIG. 1) that shows, for example, a map around a host vehicle position based on map drawing data transmitted from a navigation device (not shown) via the controller 3, as well as a host vehicle position mark and the like.

The parking assist device 1 may include a speaker 15, as shown in FIG. 1. The speaker 15 may output a variety of voice guidance or guidance sounds based on a voice output signal transmitted from the controller 3.

The control portion 2 may include an image processor 11 serving as a combining unit, as shown in FIG. 1. The image processor 11 may, for example, receive the peripheral image data G from the controller 3, and perform correction of the peripheral image data G and/or create the image combining data, for example, in conjunction with the controller 3.

In the correction of the peripheral image data G, the image processor 11 may, for example, corrects the distortion aberration caused by the wide-angle lens. In the creation of the image combining data, the image processor 11 may execute image combining processing in order to superimpose, for example, the calculated vehicle width extension lines 42, the first predicted locus lines 41*a*, and/or, the second predicted locus lines 41*b* on the peripheral image based on the corrected peripheral image data G and may display them on the display 12.

FIGS. 6 to 9 show exemplary parking assist methods. The exemplary methods may be implemented, for example, by one or more components of the above-described parking assist device. However, even though the exemplary structure of the above-described device may be referenced in the description of the methods, it should be appreciated that the referenced structure is exemplary and the exemplary methods need not be limited by any of the above-described exemplary structure. Note that, for the convenience of explanation, a description will be given for the case where a driver backs the vehicle C from a position illustrated in FIG. 10 to park into one parking area R (a target parking area R1) of the respective parking areas R of the parking lot.

Figure 6:
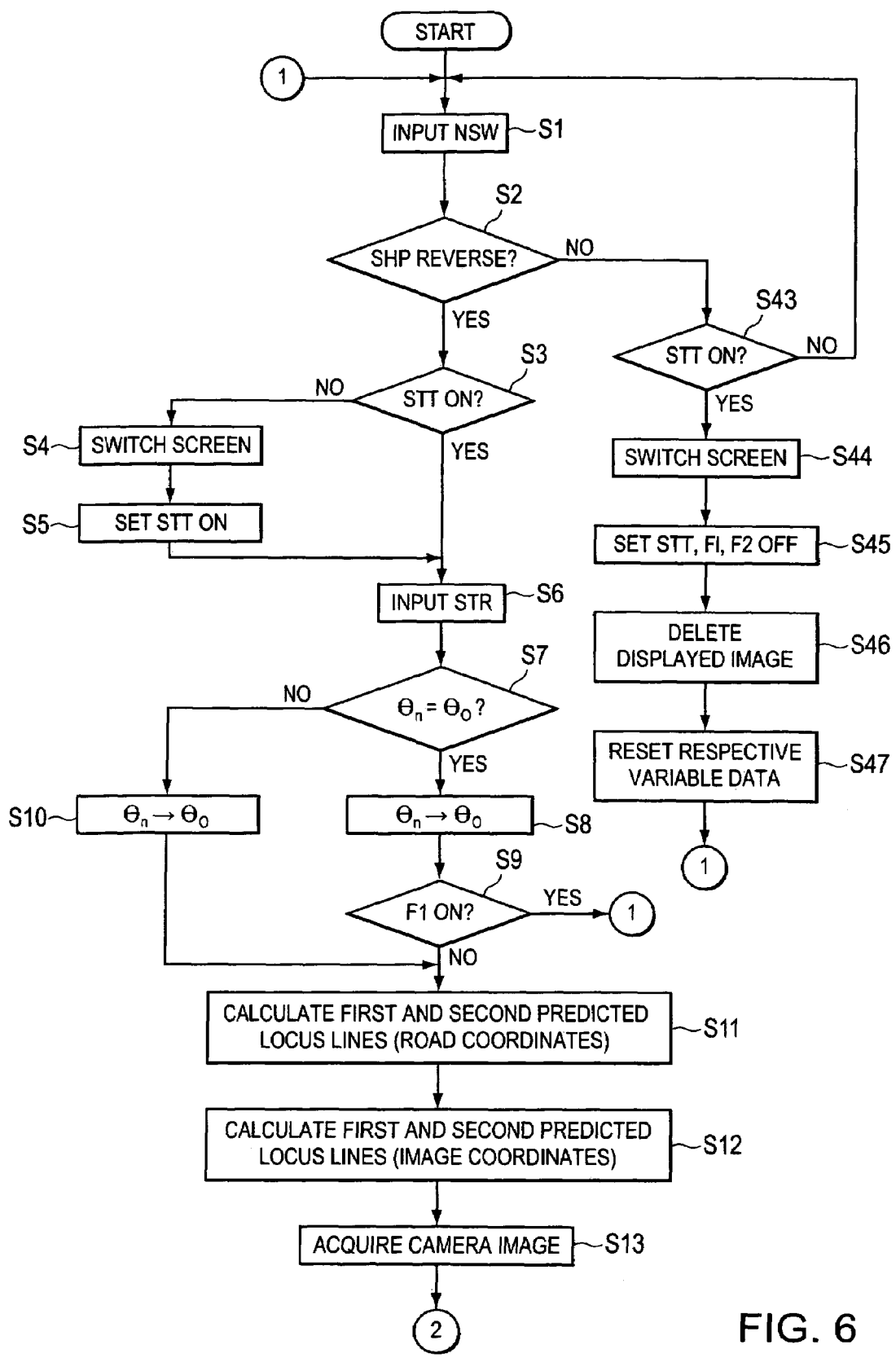
FIG. 6 shows an exemplary parking assist method.
Figure 10:
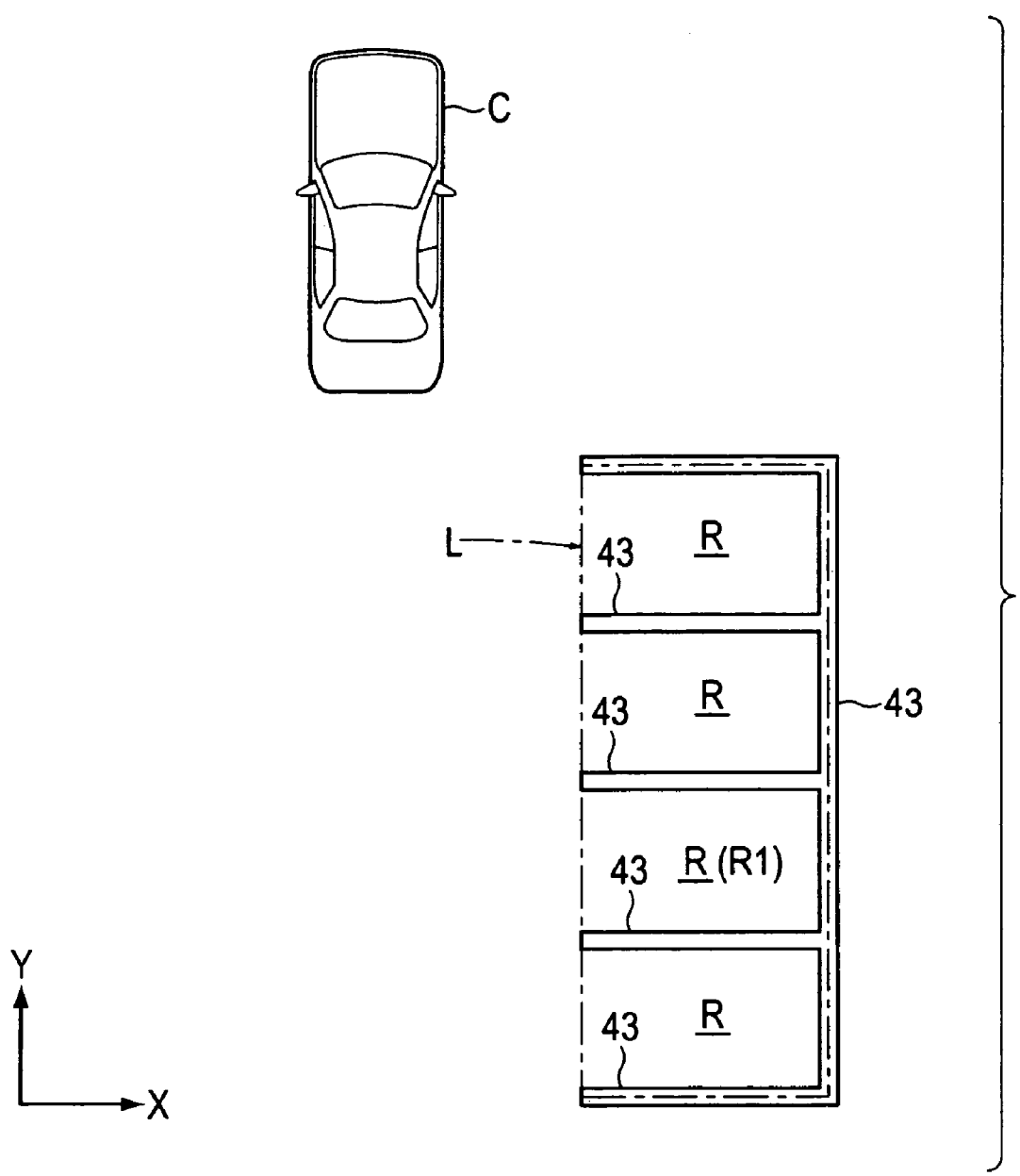
FIG. 10 shows an exemplary positional relationship between a parking area and the vehicle.

As shown in FIG. 6, when the vehicle C is located at the position illustrated in FIG. 10 and a shift lever is shifted to a reverse position in order to park the vehicle into the target parking area R1, the controller 3 may receive the shift position signal NSW from the shift sensor 24 (step S1), and may determine whether the shift position SHP of the transmission is in the reverse state based on the shift position signal NSW (step S2).

If the controller 3 determines that the shift position SHP of the transmission is in the reverse state (step S2=YES), the controller 3 may checks whether a system startup flag STT stored in the predetermined storage area in the RAM 4 is ON (step S3). If the system startup flag STT is OFF, for example, because the parking assist has just begun by shifting the shift lever to the reverse position, (S3=NO), the controller 3 may switch the screen (step S4). By switching the screen, the controller 3 may control the rear camera 22 and the image data interface 10 in order to acquire the peripheral image data G.

After the system startup flag STT is set to ON (step S3=YES), or subsequent to the start of the screen switching and the startup of the parking assist system (step S5), the controller 3 may receive the steering angle signal STR from the steering sensor 23 (step S6). Then, the controller 3 may compare the steering angle qn based on this steering angle signal STR with a steering angle qo based on a steering angle signal STR previously obtained (step S7). For example, the steering angle qn immediately after the shift lever is shifted to the reverse position may be compared with the steering angle qo before the shift lever is shifted to the reverse position, which has been previously stored in the predetermined storage area in the RAM 4.

When it is determined that the new steering angle qn is the same as the previous steering angle qo due to no steering operation (YES, in step S7), the controller 3 may store the newly detected steering angle qn in the predetermined storage area in the RAM 4 in place of the previous steering angle qo (step S8).

After storing the new steering angle qn in the predetermined storage area in the RAM 4, the controller 3 may check whether a second predicted locus line flag F1 stored in a predetermined storage area in the RAM 4 is ON (step S9). Note that the second predicted locus line flag F1 is OFF when the second predicted locus lines 41*b* are displayed, and contrarily, the flag F1 is ON when the second predicted locus lines 41*b* are not displayed. The controller 3 may perform rewriting according to a calculation processing to be described later. If flag F1 is OFF, the controller 3 may determine that the second predicted locus line flag F1 is OFF (NO, in step S9), and the control goes to step S1.

On the other hand, when it is determined in step S7 that the new steering angle qn is not the same as the previous steering angle qo (S7=NO), the controller 3 may store the newly detected steering angle qn in the predetermined storage area in the RAM 4 in place of the previous steering angle qo (step S10), and then the process goes to step S11.

Next, the controller 3 may calculate the first predicted locus lines 41*a* and the second predicted locus lines 41*b* on the road coordinates based on the vehicle width extension lines 42 and the steering angle qo at that point of time (step S11). Subsequently, the controller 3 may transform the calculated first and second predicted locus lines 41*a*, 41*b* and the vehicle width extension lines 42 on the road coordinates into the first and second predicted locus lines 41*a*, 41*b* and the vehicle width extension lines 42 on the image coordinates (step S12).

Figure 7:
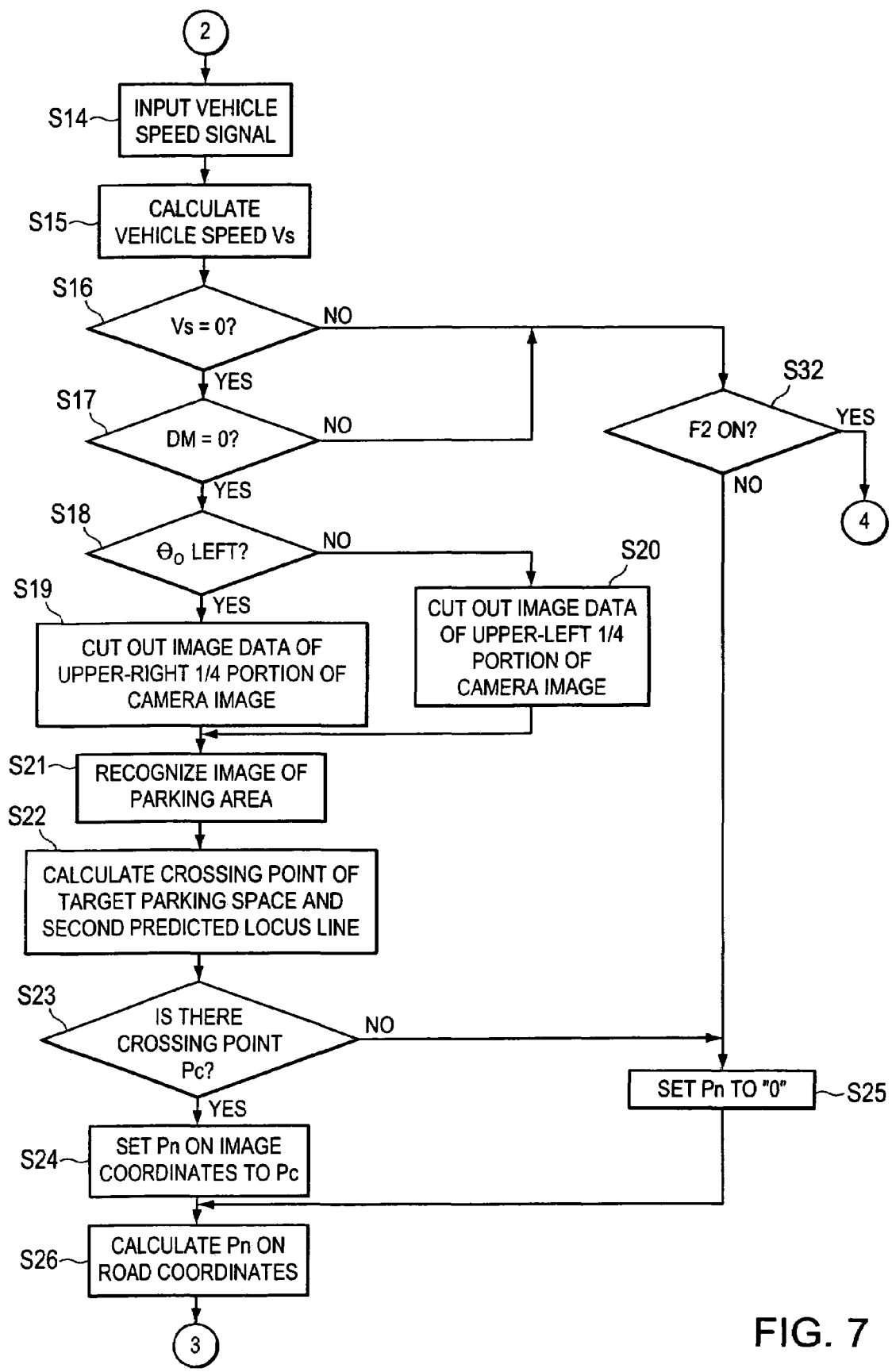
FIG. 7 shows an exemplary parking assist method.

After calculating the first and second predicted locus lines 41*a*, 41*b* and the vehicle width extension lines 42 on the image coordinates, the controller 3 may obtain the peripheral image data G taken by the rear camera 22 (step S13). Then, as shown in FIG. 7, the controller 3 may receive a vehicle speed signal from the vehicle speed sensor 20 (step S14). Thereafter, the controller 3 may calculate the vehicle speed Vs of the vehicle C at that point of time based on the received vehicle speed signal (step S115). Then, the controller 3 may receive a travel distance signal from the travel distance sensor 21, and based on the travel distance signal, the controller 3 may calculate a moving distance (i.e., a backward moving distance) DM from the point in time at which the system startup flag STT becomes ON (i.e., the time point at which the parking assist system is started).

The controller 3 may then determine whether the vehicle C is stopped, for example, based on the calculated vehicle speed Vs (step S116). If, for example, the parking assist system has just been started, and the vehicle C is stopped (S16=YES), the controller 3 may determine whether the vehicle C has not moved at all since the start-up of the parking assist system (step S17), for example, based on the calculated moving distance DM. If the vehicle C has not traveled (S17=YES), the process goes to step S18.

Based on the steering angle qo (obtained in the above-described step S8 or step S10), the controller 3 may determines whether the backward moving direction of the vehicle C is to the left or to the right as seen from the rear of the vehicle C (step S118).

When it is determined that, based on the steering angle qo (i.e., the steering angle when the steering wheel is turned left), the backward moving direction is to the right as seen from the rear of the vehicle (S18=YES), the image data of an upper-right portion corresponding to ¼ of the peripheral image data G (obtained in step S113) is cut out (Step S19). This is, for example, a preparation process for facilitating image recognition of the parking area R. Based on the steering angle qo at this point of time, the vehicle C may be moved backward, heading toward the position (i.e., the position at which the parking area R1 is located) displayed in the upper-right ¼ portion of the image on the display 12.

On the other hand, when it is determined that, based on the steering angle qo (i.e., the steering angle when the steering wheel is turned right), the backward moving direction is to the left as seen from the rear of the vehicle (S18=NO), the image data of an upper-left portion corresponding to ¼ of the peripheral image data G is cut out (step S20). Again, this may be a preparation process for facilitating image recognition of the parking area R. Based on the steering angle qo at this point of time, the vehicle C may be moved backward, heading toward the position (i.e., the position at which the parking area R1 is located) displayed in the upper-left ¼ portion of the image on the display 12.

Once the upper-right ¼ image data or the upper-left ¼ image data is cut (steps S19 or S20), the controller 3 may perform image recognition of the parking area R, using the cut-out image data (step S21). For example, as shown in FIG. 10, the image recognition of the parking area R may be performed such that the parking area R defined by white lines 43 on the road surface is recognized. The parking area R may be recognized by extracting pixel data corresponding to the white lines 43 from the cutout image data. When there is a plurality of the parking areas R and there is no vehicle parked, as shown in FIG. 10, a target parking space L in a large size surrounded by the chain line may be recognized as one parking area. On the other hand, when there are vehicles parked and there is only one vacant parking area R, the aforementioned target parking space L surrounded by the chain line becomes the target parking space L in a small size encompassing the one parking area R, and this target parking space L is recognized as a parking area.

After recognizing the image of the parking area R and extracting it as the target parking space L (step S21), the controller 3 may calculate the crossing points Pc of the target parking space L and the second predicted locus lines 41b on the image coordinates obtained in step S12 (step S22). Then, the controller 3 may determine whether there are crossing points Pc at which the second predicted locus lines 41b on the image coordinates intersect with the target parking space L on the image coordinates (step S23).

When it is determined that there are the crossing points Pc (step S23=YES), the controller 3 may set the ends Pn of the second predicted locus lines 41b to the calculated crossing points Pc (step S24). That is, it may be sufficient for the guidance to display the lengths Ln (or the ends Pn) of the second predicted locus lines 41b up to the target parking space L (or the parking area R). If the displayed second predicted locus lines 41b are longer, the rear state is hidden by the second predicted locus lines 41b, which may be prevented. On the other hand, when it is determined that there are no crossing points Pc (step S23=NO), the controller 3 may set the lengths Ln (or the ends Pn) of the second predicted locus lines 41b to zero (step S25). In other words, the second predicted locus lines 41b may not be displayed if they do not intersect with the target parking space L.

When the lengths Ln (or the ends Pn) of the second predicted locus lines 41b on the image coordinates are set (in step S24 or S25), the controller 3 may calculate the ends Pn of the second predicted locus lines 41b on the road coordinates based on the ends Pn of the second predicted locus lines 41b on the image coordinates (step S26).

Figure 8:
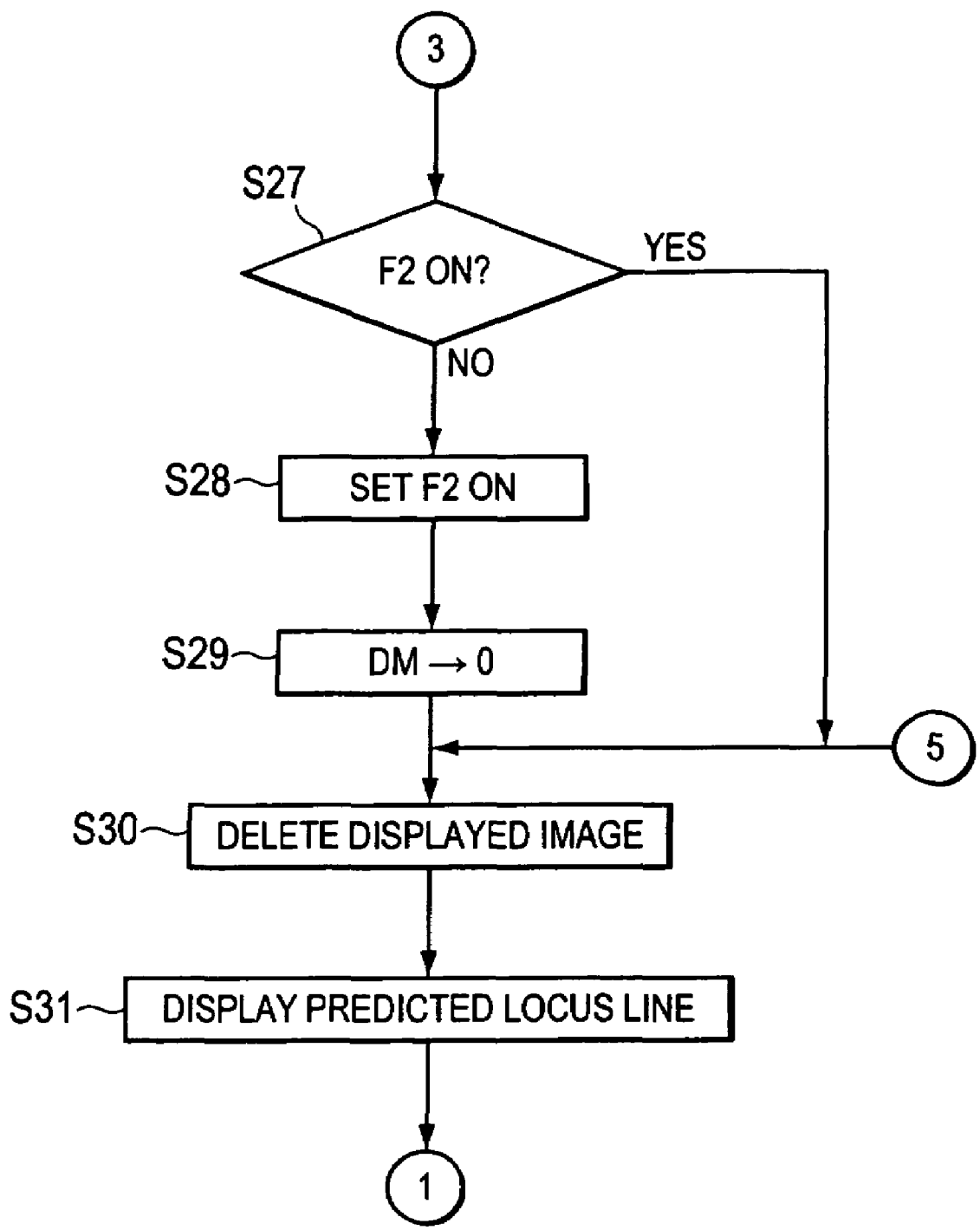
FIG. 8 shows an exemplary parking assist method.
Figure 9:
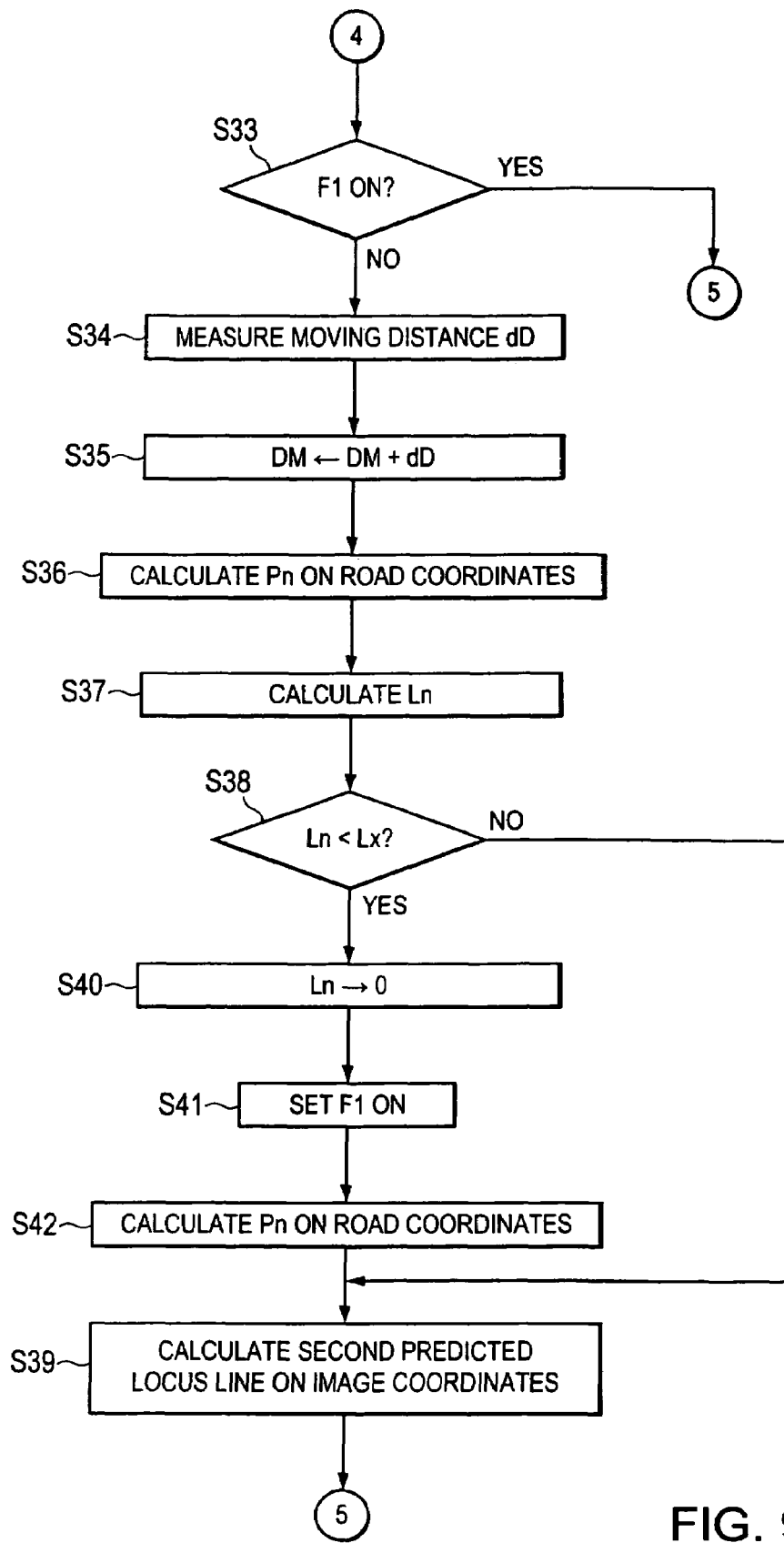
FIG. 9 shows an exemplary parking assist method.

Next, as shown in FIG. 8, the controller 3 may check whether an end-setting flag F2 stored in a predetermined storage area in the RAM 4 is ON (step S27). Note that the end-setting flag F2 is ON when the ends Pn of the second predicted locus lines 41b have already been calculated and the end-setting flag F2 is OFF when the ends Pn of the second predicted locus lines 41b are calculated for the first time.

For example, when the ends Pn of the second predicted locus lines 41b are calculated for the first time, the end-setting flag F2 is therefore OFF (step S27=NO), and the controller 3 may set the end-setting flag F2 ON (step S28). Subsequently, the controller 3 may set the moving distance DM stored in the RAM 4 to zero (step S29). This sets the reference for changing the ends Pn of the second predicted locus lines 41b based on the backward moving distance (i.e., the moving distance DM) from this point of time.

When the moving distance DM stored in the RAM 4 is set to zero, the controller 3 may temporarily resets a display on the display 12 (step S30). Thereafter, the controller 3 may start to display the first predicted locus lines 41a, the second predicted locus lines 41b, and/or the vehicle width extension lines 42, which are superimposed on the rear vision screen 40 (step S31). Then, the process of the controller 3 returns to step S1.

Accordingly, when the steering operation is performed with the vehicle C stopped, the first and second predicted locus lines 41a and 41b may be newly set based on the vehicle width extension lines 42 and the steering operation. Then, the newly set first and second predicted locus lines 41a and 41b, and the vehicle width extension lines 42 may be superimposed on the rear vision screen 40, and displayed on the display 12 in step S31. As a result, the driver can easily drive the vehicle C into the parking area R1, if the driver operates the steering wheel so as to adjust the ends Pn of the second predicted locus lines 41b to the parking area R1, looking at the second predicted locus lines 41b displayed on the display 12.

Returning to FIG. 7, when the vehicle speed Vs or the moving distance DM is generated by running toward the parking area R1 in step S16 or S17 (steps S16 or S17=NO), the controller 3 may checks whether the end-setting flag F2 stored in the RAM 4 is ON (Step S32).

If the flag F2 has been set to ON, (step S28=YES), the controller 3 may checks whether the second predicted locus line flag F1 is ON (step S33). For example, if the vehicle C is sufficiently away from the parking area R1, the lengths Ln (or the ends Pn) of the second predicted locus lines 41b may be changed and the flag F1 is OFF (Step S33=NO). Thus, the controller 3 may receive a travel distance signal from the travel distance sensor 21, and measures a moving distance dD (step S34). The controller 3 may add the measured moving distance dD to the previous moving distance DM to obtain the moving distance DM from the previous position (e.g., set in step S29) to the current position (step S35).

The controller 3 may change the previous lengths Ln (or the ends Pn) of the second predicted locus lines 41b on the road coordinates (obtained in step S26), based on the movement of the vehicle C, namely, the moving distance DM. In other words, the controller 3 may recalculate the crossing points Pc (or the ends Pn) with the target parking space L (step S36), and then may calculate the lengths Ln of the second predicted locus lines 41b extending up to the crossing points Pc (or the ends Pn) (step S37). Incidentally, even when the vehicle C moves, the lengths Ln (or the ends Pn) of the second predicted locus lines 41b on the image coordinates are changed in order to prevent the ends Pn of the second predicted locus lines 41b from entering inside the parking area R1.

After the lengths Ln of the second predicted locus lines 41b are newly calculated, the controller 3 may determine whether the newly calculated lengths Ln are shorter than predetermined very short lengths (i.e., reference minimum lengths) Lx (step S38). The reference minimum lengths Lx may be set to such lengths as to enable recognition of the running loci up to the rearward parking area R1 using only the display of the first predicted locus lines 41a, i.e., without displaying the second predicted locus lines 41b. If the vehicle C has not been backed up to the parking area R1, the calculated lengths Ln may be longer than the reference minimum lengths Lx.

When it is determined that the calculated lengths Ln of the second predicted locus lines 41b are longer than the reference minimum lengths Lx (step S38=NO), the controller 3 may immediately calculate the first predicted locus lines 41a, the second predicted locus lines 41b, and the vehicle width extension lines 42 on the image coordinates (step S39). After the controller 3 calculates the first and second predicted locus lines 41a, 41b, and the vehicle width extension lines 42 on the image coordinates, the controller 3 again temporarily resets a display on the display 12 (return to step S30). Thereafter, the controller 3 again starts to display the newly calculated first and second predicted locus lines 41a, 41b, and vehicle width extension lines 42, which are superimposed on the rear vision screen 40 (step S31). Then, the process of the controller 3 may repeat (returns to step S1).

Thus, it is prevented that the ends Pn of the second predicted locus lines 41b enter into the parking area R1, as the vehicle C moves backward heading toward the parking area R. The lengths Ln of the second predicted locus lines 41b may be displayed such that they become shorter relative to the backward movement. As a result, unnecessary portions of the second predicted locus lines 41b are not displayed. Therefore, an image projected to the rear is not hidden.

When the lengths Ln of the second predicted locus lines 41b become shorter than the reference minimum lengths Lx along with the backward movement of the vehicle C (S38=YES), the controller 3 may set the lengths Ln of the second predicted locus lines 41b to zero (step S40), and set the second predicted locus line flag F1 to ON (step S41). Then, after the controller 3 calculates the ends Pn of the second predicted locus lines 41b on the road coordinates (step S42), the first predicted locus lines 41a, the second predicted locus lines 41b, and the vehicle width extension lines 42 on the image coordinates are calculated. In this case, the lengths Ln are zero, so that the controller 3 does not calculate the second predicted locus lines 41b.

Thus, when the vehicle C moves backward in accordance with the steering operation, the first predicted locus lines 41a and the vehicle width extension lines 42 are set. The set first predicted locus lines 41a and the vehicle width extension lines 42 are superimposed on the rear vision screen 40 and displayed on the display 12 (in step. S31). Thus, the driver can park the vehicle into the parking area R1 by operating the steering wheel according to the first predicted locus lines 41a and the vehicle width extension lines 42, without being bothered by the display of the second predicted locus lines 41b.

When the parking of the vehicle C into the parking area R1 is completed, and, for example, the shift lever is shifted to the neutral or parking position, the controller 3 may determines that the shift position SHP of the transmission is shifted to a state other than a reverse state (S2=NO), and the controller 3 checks whether the system startup flag STT is ON (step S43). If the system startup flag STT has been set to ON (e.g., in step S5), the screen is switched (step S44). By switching the screen, the controller 3 may controls the rear camera 22 and the image data interface 10 to stop acquiring the peripheral image data G.

Next, the controller 3 may sets all of the flags STT, F1 and F2 to OFF (step S45). Subsequently, the controller 3 may stop displaying the peripheral image taken by the rear camera 22 (step S46), and may reset variable data such as the moving distance DM, the first predicted locus lines 41a, the second predicted locus lines 41b, the vehicle width extension lines 42 and the like, which are temporarily stored in the RAM 4 (step S47).

After the controller 3 resets the variable data, the process may return to step S1, and the controller 3 may wait for another parking assist operation.

According to the above-described examples, the first predicted locus lines 41a that may change in accordance with the steering angle qn, and the vehicle width extension lines 42 may be superimposed on the rear vision screen 40 and displayed on the display 12. Further, the second predicted locus lines 41b may change in accordance with the steering angle and may indicate the locus line extending up to the parking area R (R1), which may be projected to the rear of the rear vision screen 40 and which the first predicted locus lines 41a do may not reach, may be superimposed on the rear vision screen 40 and displayed on the display 12. Accordingly, if the driver operates the steering wheel so as to adjust the second predicted locus lines 41b displayed on the display 12 to the parking area R (R1), the driver can accurately perform steering operation for parking from the position away from the parking area R (R1), namely, at an earlier timing. Thus, the driver can calmly and easily drive the vehicle C into the parking area R1 even when approaching near to the parking area R (R1).

According to the above examples, the ends Pn of the second predicted locus lines 41b may be displayed so as not to enter inside the parking area R1. The ends Pn of the second predicted locus lines 41b may not enter inside the parking area R1 as the vehicle C moves backward heading toward the parking area R. The lengths Ln thereof may be displayed such that they become shorter relative to the backward movement. As a result, unnecessary portions of the second predicted locus lines 41b are not displayed. Therefore, an image projected to the rear is not hidden.

According to the above examples, when approaching the parking area R1, the second predicted locus lines 41b may not be displayed. Thus, the driver can park the vehicle into the parking area R1 by operating the steering wheel according to the first predicted locus lines 41a and the vehicle width extension lines 42, without being bothered by the display of the second predicted locus lines 41b.

According to the above examples, the second predicted locus lines 41b may be displayed such that they are extended continuously from the first predicted locus lines 41a. Thus, the predicted locus lines can be displayed on the display 12 as smoothly continuous lines. This avoids giving an uncomfortable feeling to the driver.

According to the above examples, the first predicted locus lines 41a may be shown as solid lines and the second predicted locus lines 41b may be shown as chain lines to distinguish display patterns thereof. Thus, the driver can easily recognize the difference thereof, and the driver can operate the steering wheel without uncomfortable feeling.

According to the above examples, when recognizing the image of the perking area R, the upper-left ¼ image data or the upper-right ¼ image data may be cut out from the peripheral image data G in accordance with the steering angle, and image recognition may be performed using the partially cut out image data. Therefore, the image of the parking area R may be recognized using the necessary and small image data, by eliminating unnecessary image data. As a result, the processing load of the controller 3 may be reduced and the image recognition can be completed in less time.

According to the above examples, the second predicted locus lines 41b may be shown as broken lines; however, they may alternatively be shown as solid lines. Further, the first predicted locus lines 41a and the second predicted locus lines 41b may be displayed in different colors.

According to the above examples, when the display of the second predicted locus lines 41b is ended, the announcement of the completion of the parking assist by the display of the second predicted locus lines 41b may be given as voice guidance using, for example, the speaker 15.

According to the above examples, a portion of the image data may be cut out from the peripheral image data G, and the image recognition may be performed using the cut out partial image data. However, the image recognition of the parking area R may also be performed using all or any other part of the image data.

According to the above examples, the image recognition has been explained using, the exemplary parking area R defined by the white lines 43 on the road surface. However, it is also possible for the parking area R to be defined by a car stop, a rope, a cone, a fence, or any other indication, or the parking area R may be a garage.

According to the above examples, the predicted locus lines 41 may be calculated, and then the first and second predicted locus lines 41a and 41b may respectively be calculated from the predicted locus lines 41. However, the first and second predicted locus lines 41a and 41b may be calculated separately.

According to the above examples, the parking area R may be obtained by image recognition. However, the parking area may be designated by the driver, for example, by touching the rear vision screen 40 displayed on the display 12.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A parking assist method, comprising:
    taking a peripheral image of a vehicle;
    displaying the peripheral image on a display;
    recognizing a parking area;
    displaying a first predicted locus line on the display, the first predicted locus line extending up to a predetermined distance from the vehicle and being superimposed on the peripheral image;
    changing the display of the first predicted locus line in accordance with a steering angle of a steering wheel;
    displaying a second predicted locus line superimposed on the peripheral image, the second predicted locus line extending up to the recognized parking area and being displayed on an extension line of the first predicted locus line; and
    changing the display of the second predicted locus line in accordance with the steering angle of the steering wheel.

2. The parking assist method of claim 1, further comprising determining the steering angle of the steering wheel.

3. The parking assist method of claim 2, wherein if the steering angle is to the left of a front of the vehicle, recognizing the parking area comprises:
    automatically performing image recognition on the upper-right portion of the peripheral image in order to recognize the parking area.

4. The parking assist method of claim 2, wherein if the steering angle is to the right a front of the vehicle, recognizing the parking area comprises:
    automatically performing image recognition on the upper-left portion of the peripheral image in order to recognize the parking area.

5. The parking assist method of claim 1, further comprising:
    extracting image data of a partial image in a travel direction from the peripheral image in accordance with the steering angle of the steering wheel;
    wherein said recognizing of the parking area comprises recognizing an image of the parking area based on the image data of the partial image.

6. The parking assist method of claim 1, wherein said displaying of the second predicted locus line comprises:
    displaying the second predicted locus line having at least one of a different color, a different line type, and a different pattern from the first predicted locus line.

7. The parking assist method of claim 1, wherein said displaying the first predicted locus line comprises:
    displaying two first predicted locus lines superimposed on the peripheral image, the first predicted locus lines separated by a predetermined distance.

8. The parking assist method of claim 1, wherein said displaying of the second predicted locus line comprises:
displaying two second predicted locus lines superimposed on the peripheral image, the second predicted locus lines separated by a predetermined distance.

9. The parking assist method of claim 1, further comprising:
displaying vehicle width extension lines superimposed on the peripheral image on the display, the vehicle width extension lines separated by a width of the vehicle and each extending rearward in a straight manner, irrespective of the steering angle.

10. A storage medium storing a set of program instructions executable by a data processing device, the instructions usable to implement the method of claim 1.

11. A parking assist system, comprising:
a rear camera that takes a peripheral image of a vehicle;
a display unit that displays the peripheral image taken by the rear camera; and
a controller that:
recognizes an image of a parking area based on image data of the peripheral image taken by the rear camera;
calculates a first predicted locus line extending up to a predetermined distance from the vehicle;
if a steering angle of a steering wheel changes, recalculates the first predicted locus line in accordance with the changed steering angle;
displays the first predicted locus line superimposed on the peripheral image on the display unit;
calculates a second predicted locus line that extends from an end of the first predicted locus line;
if the steering angle of the steering wheel changes, recalculates the second predicted locus line in accordance with the changed steering angle;
calculates a crossing point of the parking area and the second predicted locus line; and
displays the second predicted locus line superimposed on the peripheral image on the display unit, the second predicted locus line displayed extending up to the calculated crossing point.

12. The parking assist system of claim 11, wherein if the steering angle is to the left of a front of the vehicle, the controller:
automatically performs image recognition on the upper-right portion of the peripheral image in order to recognize the parking area.

13. The parking assist system of claim 11, wherein if the steering angle is to the right of a front of the vehicle, the controller:
automatically performs image recognition on the upper-left portion of the peripheral image in order to recognize the parking area.

14. The parking assist system of claim 11, wherein the controller extracts image data of a partial image in a travel direction from the peripheral image taken by the rear camera in accordance with the steering angle of the steering wheel, and recognizes the image of the parking area based on the image data of the partial image.

15. The parking assist system of claim 11, wherein the controller:
inhibits display of the second predicted locus line when the crossing point of the parking area and the second predicted locus line cannot be calculated; and
displays only the first predicted locus line superimposed the peripheral image on the display unit.

16. The parking assist system of claim 11, wherein the second predicted locus line is displayed having at least one of a different color, a different line type, and a different pattern from the first predicted locus line.

17. The parking assist system of claim 11, wherein the controller:
displays two first predicted locus lines superimposed on the peripheral image, the first predicted locus lines separated by a predetermined distance.

18. The parking assist system of claim 11, wherein the controller:
displays two second predicted locus lines superimposed on the peripheral image, the second predicted locus lines separated by a predetermined distance.

19. The parking assist system of claim 11, wherein the controller:
displays vehicle width extension lines superimposed on the peripheral image on the display, the vehicle width extension lines separated by a width of the vehicle and each extending rearward in a straight manner, irrespective of the steering angle.

20. A parking assist system, comprising:
means for taking a peripheral image of a vehicle;
means for displaying the peripheral image on a display;
means for displaying a first predicted locus line on the display, the first predicted locus line extending up to a predetermined distance from the vehicle and being superimposed on the peripheral image;
means for changing the display of the first predicted locus line in accordance with a steering angle of a steering wheel;
means for displaying a second predicted locus line superimposed on the peripheral image, the second predicted locus line extending up to a parking area whose image is recognized by a parking area recognition unit and being displayed on an extension line of the first predicted locus line; and
means for changing the display of the second predicted locus line in accordance with the steering angle of the steering wheel.

* * * * *